(12) United States Patent
McClure et al.

(10) Patent No.: US 7,152,133 B2
(45) Date of Patent: Dec. 19, 2006

(54) EXPANDED FUNCTIONALITY PROTOCOL ADAPTER FOR IN-VEHICLE NETWORKS

(75) Inventors: Robert McClure, Danville, IN (US); David Such, Greenwood, IN (US)

(73) Assignee: Dearborn Group, Inc., Farmington Hills, MI (US)

( * ) Notice: Subject to any disclaimer, the term of this patent is extended or adjusted under 35 U.S.C. 154(b) by 743 days.

(21) Appl. No.: 09/942,130

(22) Filed: Aug. 29, 2001

(65) Prior Publication Data
US 2002/0046313 A1 Apr. 18, 2002

Related U.S. Application Data

(60) Provisional application No. 60/229,008, filed on Aug. 30, 2000.

(51) Int. Cl.
*G06F 13/36* (2006.01)
(52) U.S. Cl. .................. 710/315; 710/11; 710/105; 710/100
(58) Field of Classification Search ................ 710/305, 710/107, 100; 701/1, 29, 33, 208; 235/379
See application file for complete search history.

(56) References Cited

U.S. PATENT DOCUMENTS

| | | | | | |
|---|---|---|---|---|---|
| 4,720,807 | A | * | 1/1988 | Ferran et al. ................ | 700/282 |
| 5,293,317 | A | * | 3/1994 | Adrain et al. ................ | 701/115 |
| 5,347,524 | A | * | 9/1994 | I'Anson et al. ............... | 714/39 |
| 5,459,660 | A | * | 10/1995 | Berra .......................... | 701/33 |
| 5,646,535 | A | * | 7/1997 | Dornier ....................... | 324/556 |
| 5,764,156 | A | * | 6/1998 | Chaloux ...................... | 340/5.61 |
| 5,881,281 | A | * | 3/1999 | Gates et al. .................. | 713/1 |
| 6,081,858 | A | * | 6/2000 | Abudayyeh et al. ........ | 710/301 |
| 6,320,876 | B1 | * | 11/2001 | Virdee et al. ................ | 370/468 |
| 6,389,337 | B1 | * | 5/2002 | Kolls .......................... | 701/29 |
| 6,486,801 | B1 | * | 11/2002 | Jones .......................... | 340/994 |
| 6,526,340 | B1 | * | 2/2003 | Reul et al. ..................... | 701/29 |
| 6,647,323 | B1 | * | 11/2003 | Robinson et al. ............. | 701/1 |
| 6,751,484 | B1 | * | 6/2004 | Sandelius et al. ........... | 455/566 |
| 2002/0039026 | A1 | * | 4/2002 | Stroth et al. ................. | 324/509 |
| 2002/0046313 | A1 | * | 4/2002 | McClure et al. ............ | 710/305 |
| 2003/0120851 | A1 | * | 6/2003 | Gafford et al. ............. | 710/306 |

* cited by examiner

*Primary Examiner*—Rehana Perveen
*Assistant Examiner*—Kim T. Huynh
(74) *Attorney, Agent, or Firm*—Warn, Hoffmann, Miller & LaLone, P.C.

(57) ABSTRACT

The invention is an improved protocol adapter for in-vehicle networks for diagnostics, analysis and monitoring. The invention has a pass through feature (voltage translator)/smart mode that allows the protocol adapter to emulate older boxes. Visual indicators (LEDs) indicate the pass through feature is in operation. LEDs also indicate activity on the on the RS232 bus between the adapter and a PC. Single color and multiple color emitting LEDs indicate a program is being executed and identify the program that is being executed. The protocol adapter supports RP1202 and RP1210, J1708 and J1939 and J1939 Transport Layer. The improved protocol adapter has a Real Time Clock, Standard COMM port connection, 7–32 Volt Supply and is CE compliant. The adapter can be used wirelessly.

5 Claims, 23 Drawing Sheets

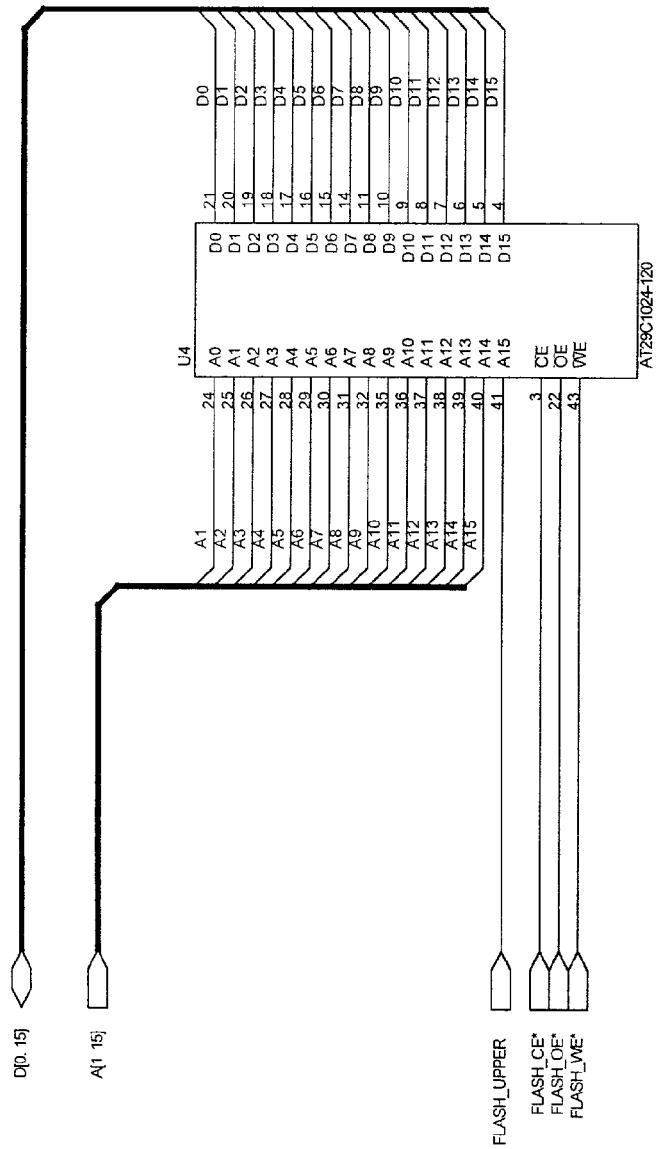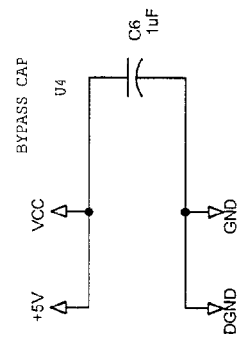
FIG 6

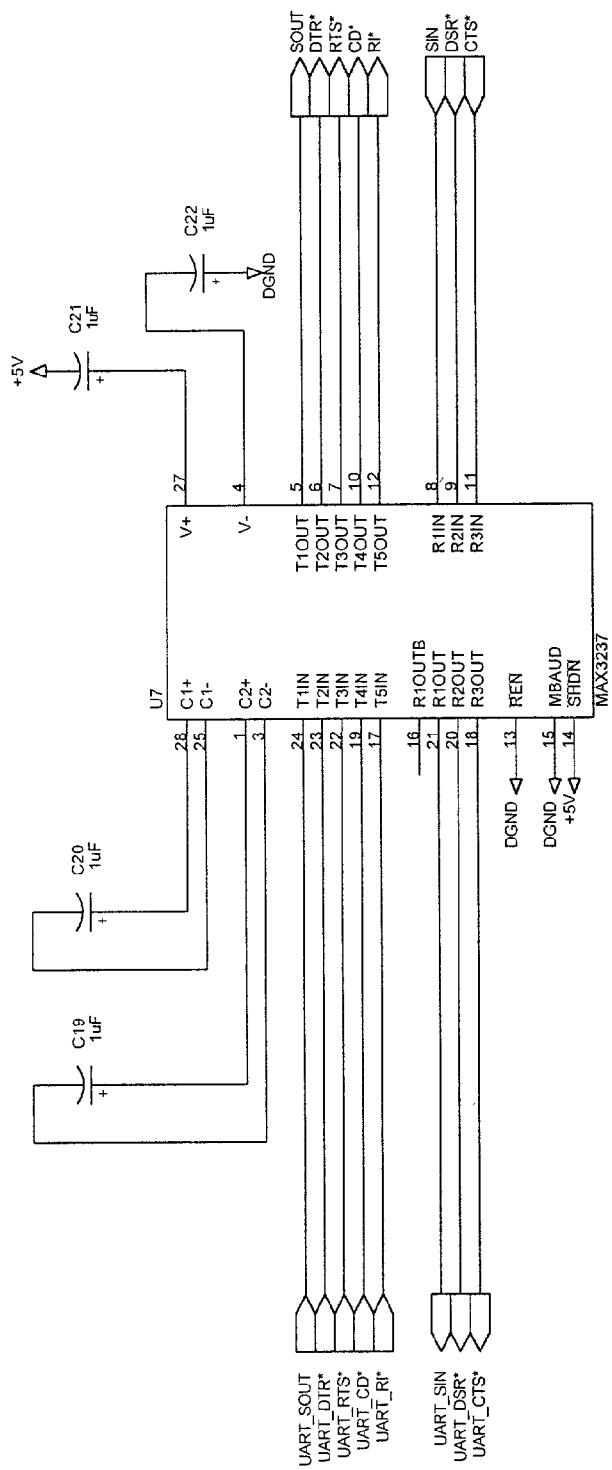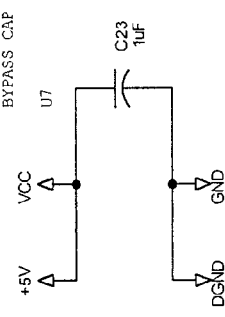
FIG 13

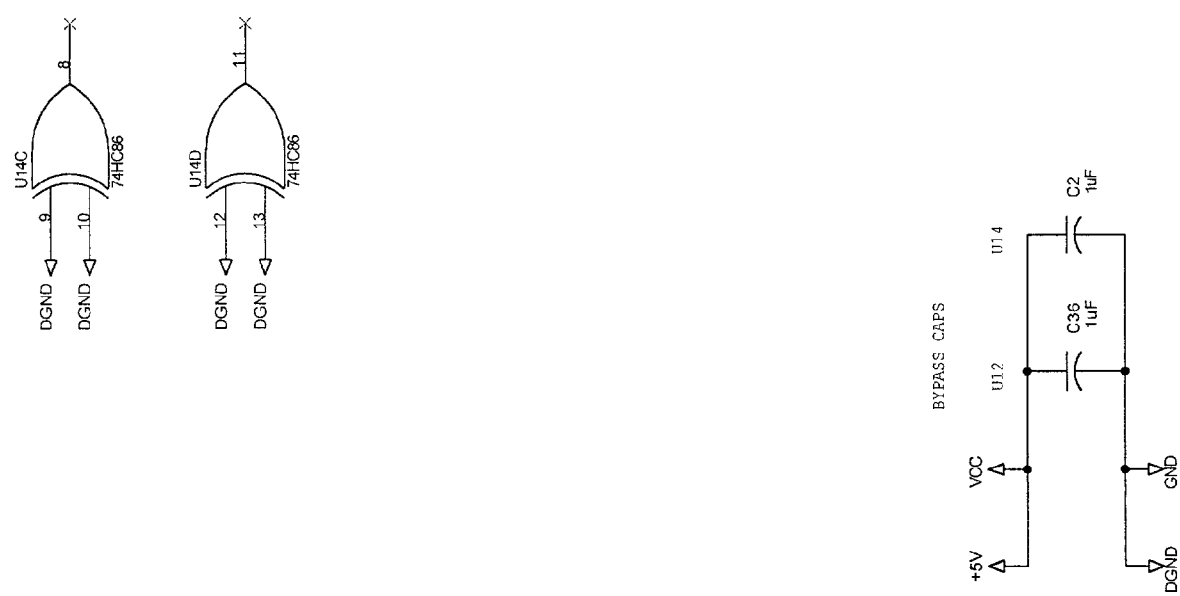

FIG 21

LED No. 1 (red) - Black text, Power, indicates power on when illuminated.

FIG 22

LED No. 2 - Black text, Mode, plus red and green text as shown below:

| Red text | Corresponding meaning for LED when illuminated (red) |
|---|---|
| DPA | Normal operation of the DPA unit. Flashes red only when serial communications with PC is occurring. |

| Green text | Corresponding meaning for LED when illuminated (green) |
|---|---|
| PASS | Normal DPA operation is suspended, and the protocol pass-through functionality is activated. Indicated by steady flashing green. |

| Note: | Alternating red/green indicates reflash (reprogramming) in progress. |
|---|---|

FIG 23

LED No. 3 - Red and green text as shown below:

| Red text | Corresponding meaning for LED when illuminated (red) |
|---|---|
| J1939 | Dual-wire CAN is in operation: (J1939, Standard CAN or J2284 High-speed CAN) Flashes red when valid bus traffic is present. |

| Green text | Corresponding meaning for LED when illuminated (green) |
|---|---|
| SW CAN | Single-wire CAN is in operation: J2411 (if implemented). Flashes green for bus traffic. |

FIG 24

LED No. 4 - Red and green text as shown below:

| Red text | Corresponding meaning for LED when illuminated (red) |
|---|---|
| J1850 | Chrysler J1850 protocol is in operation (if implemented). Flashes red for bus traffic. |

| Green text | Corresponding meaning for LED when illuminated (green) |
|---|---|
| Class II | GM Class II J1850 protocol is in operation. Flashes green for bus traffic. |

FIG 25

LED No. 5 - Red and green text as shown below:

| Red text | Corresponding meaning for LED when illuminated (red) |
|---|---|
| J1708 | J1708 protocol is in operation. Flashes red for bus traffic |

| Green text | Corresponding meaning for LED when illuminated (green) |
|---|---|
| UART | One of several UART protocols is in operation: GM Class I (ALDL), ISO 9141-2, ISO 9141-1989, ISO-9141-Special (for Case). Flashes green for bus traffic. |

FIG 26

Dearborn Group DPA III

3 ⊕ (D6)

Mode  Power
2 ⊕   1 ⊕                                     4 ⊕ (D5)
(D8)  (D1)

5 ⊕ (D7)

Note: Characters within parenthesis refer to schematic designations (Fig.17).

EXPANDED FUNCTIONALITY PROTOCOL ADAPTER FOR IN-VEHICLE NETWORKS

CROSS-REFERENCE TO RELATED APPLICATION

This application is based on Provisional Patent Application Ser. No. 60/229,008 filed Aug. 30, 2000.

BACKGROUND OF THE INVENTION

The field of the invention pertains to in-vehicle networks for diagnostics, analysis and monitoring. The networks integrate with PC gateways for data acquisition, computer-based measurement, and automation systems with in-vehicle communication. However, in the past, when hardware components were upgraded, existing software could become non-compatible with the upgraded hardware. Manufacturers of various tools attempted to remedy these compatibility problems by using a box to talk to multiple data links. This was not very satisfactory and a better solution to this problem was needed.

SUMMARY OF THE INVENTION

The invention is an expanded protocol adapter for in-vehicle use. The protocol adapter of the invention is a diagnostic tool that can bridge a lap-top or bench-top or other computer to a vehicle network. The expanded protocol adapter has additional capabilities beyond earlier versions. It is advantageous for research and development applications, end of line testing and design and production applications such as quality control, life-cycle testing and burn-in applications. The protocol adapter of the invention solves the above-identified problem by operating as a translator box that works with a variety of software packages. Thus, the invention is operable with existing diagnostic software packages.

The expanded protocol adapter of the invention supports the following:

SAE J1850, GM Class 2 protocol;

SAE J1850, Chrysler protocol (future activation supported);

GM Class 1 UART (ALDL) protocol;

ISO 9141-2 protocol;

ISO 9141-1989 protocol;

ISO 9141-Special protocol (for Case Corp.);

SAE J2284, Dual-wire CAN protocol; and

SAE J2411, Single Wire CAN protocol (future activation supported).

A special pass-through mode allows users to continue utilizing yesterday's in-house software, while communicating with today's hardware. Older software packages such as RP1202 and RP1210 can still be employed. This feature allows users to replace aging hardware with an interface that can support existing software. Consequently, users can replace old hardware with the invention and yet maintain computability with their original software.

The earlier protocol adapter supported SAE J1708, SAE J1939, and Control-Area (CAN) networks. The earlier adapter has a voltage converter mode that supports RS-232-to-RS-485 voltage conversion. The normal RS-232 port allows direct access to the J1708/RS-485 link. The improved protocol adapter supports the listed prior protocol adapter features, including a library (DLL/VxD for Windows) and on-board flash for field upgrades. The improved protocol adapter also employs a pass-through mode which supports communication with "old" software packages (e.g. RP1202 and RP1210 (A).

The improved protocol adapter of the invention expands functionality and usage of the earlier protocol adapter and can be used with a half-slot ISA card or in a PC-104 card version.

The improved protocol adapter employs expanded use of LED's to indicate status of the device, which mode of operation, and if in communication. Dual color LED's are used to indicate which program is being executed by the protocol adapter. The pass-through ability to emulate other protocol adapters is indicated by a dual color LED to indicate the pass-through is functioning to emulate other protocol adapters. Beyond the normal use of LEDs, eight visual indicators are employed by this protocol adapter. The eight visual indicators are four dual-color LEDs (red and green). Three of the dual-color LEDs serve to notify the user which one of the six, user-selectable protocols is in use at any given time. The fourth dual-color LED indicates the mode of operation for the this protocol adapter, the DPA III Plus, referred to as "DPA" for normal mode(red) or "PASS" for pass-through mode (green). While operating in the pass-through mode, the protocol adapter additionally supports communications with various "older" software packages, such as RP 1202 or RP1210, whereas in the normal mode, such additional support is not provided. Alternating red/green indicates reflash (reprogramming) is in progress.

The status of the LEDs indicate to the user the mode of operation for the device and which of the various protocols is currently active. The meaning of the LED indicator status will be described hereinbelow.

It should be noted that earlier protocol adapters support communications with "older" protocols, but earlier protocol adapters do not provide an indication to the user as to which mode is being used (normal or pass-through).

Earlier protocol adapters used a single color LED that could only notify that there is RS232 bus activity between the device and the PC. The protocol adapter of the invention uses an LED in the same physical location, but a dual-color LED allows indication of which mode is being used. A red LED is used to indicate when power is applied to the unit.

This adapter incorporates additional functionality of supporting the use of Dearborn Programmable Bridge (DPB) software. Compatibility with the DPB allows this adapter to support translation of messages between any of the protocols currently in use, e.g., SAE J1939 to J1708. The addition of DPB capabilities is integrated into the functionality of the adapter is such a manner as the make the inclusion of support for these added capabilities transparent to the user.

The adapter provides rapid access to any supported network by allowing the user to easily switch between protocols. This rapid access affords the user with the ability to monitor and translate messages between different protocols at the same time.

An ISA, half-card version and a PC-104 version of the protocol adapter provide most of the functionality as described herein except for two functions. The two functions not supported by the ISA half-card version and the PC-104 version of the protocol adapter are pass-through mode of operation and Dearborn Programmable Bridge (DPB) software compatibility.

The protocol adapter of the invention has reflashing that allows the protocol adapter to be updated with new firmware in the field. This is accomplished by U5, U1, U8 and U4. U5 (micro) processes a command sent to the protocol adapter by the host. It then copies the reflash instructions set (loader program) into RAM (U1) and then transfers control to that program (loader). The loader program responds to the commands from the host which allows the host computer to then clear and reprogram the Flash (U4). Once the reproming is complete control is passed back to the flash program.

The protocol adapter of the invention has status lights that allow the operator to determine what program is being executed by protocol adapter embedded micro. U5 and U10 will flash the LEDs on the I/O board in a predefined manner at power up to indicate what version of firmware is being executed.

The invention has a pass through feature (voltage translator)/smart mode that allows the protocol adapter to emulate older boxes. In this mode of operation, the U5 (micro) delivers data directly from the J1708 Transceiver (U11 of I/O board) to the RS232 transceiver (U7 of I/O board) and monitors the data to provide J1708 defined timing signals on any or all of the RS232 hardware handshake lines.

The expanded protocol adapter can be used wirelessly to perform the following functions; ECU fault code interrogation; communication with a remote network; vehicle maintenance status checks or trip performance data downloads; and improved asset control, logistics and inventory management, diagnostic support, and maintenance/scheduling.

An ISA version of the improved protocol adapter is a half slot card that supports CAN (J1939 and DeviceNet), SAE J1850, and GM UART protocols.

The protocol adapter has additional unique features of bank switching, file upgrade capability, LED status, multiple datalinks, embedded versions, programmable manufacture's name, software locks, async transmit and receive, programmable timer and a scratch pad.

For bank switching, memory is swapped in and out of the processor's memory map to allow multiple programs to be run. For field upgrade capability, non-volatile memory can be programmed in the field to allow new software features to be added in the field. For LED status, LEDs are flashed in a unique sequence at power-up to indicate what version of firmware is being executed. Multiple data link may be supported at the same time. Firmware and hardware version numbers are available to the host to allow the host to determine current capabilities. The manufacturer's name is embedded in FLASH to allow VAR's to put in the name of the VAR's company.

Proprietary software lock/key may be burned into FLASH to allow use of the VAR's software. The device is capable of receiving and transmitting asynchronously of host processor and can broadcast on transmit and filter on receive.

The device has a programmable multi-function timer to support datalink communications. The scratch pad is a built-in remote access memory to allow the host to consolidate message data.

Features of the improved protocol adapter are support for RP1202 and RP1210, J1708 and J1939, J1939 Transport Layer. The improved protocol adapter has a Real Time Clock, Standard COMM port connection, 7–32 Volt Supply and is CE compliant.

BRIEF DESCRIPTION OF THE DRAWINGS

FIG. 6 illustrates Flash Memory Module;
FIG. 13 illustrates RS-232 Transceivers;
FIG. 20 illustrates Unused Gates;
FIG. 21 illustrates LED No. 1 description;
FIG. 22 illustrates LED No. 2 description;
FIG. 23 illustrates LED No. 3 description;
FIG. 24 illustrates LED No. 4 description;
FIG. 25 illustrates LED No. 5 description;
and
FIG. 26 illustrates LED layout diagram.

DESCRIPTION OF THE PREFERRED EMBODIMENTS

Figure 1:
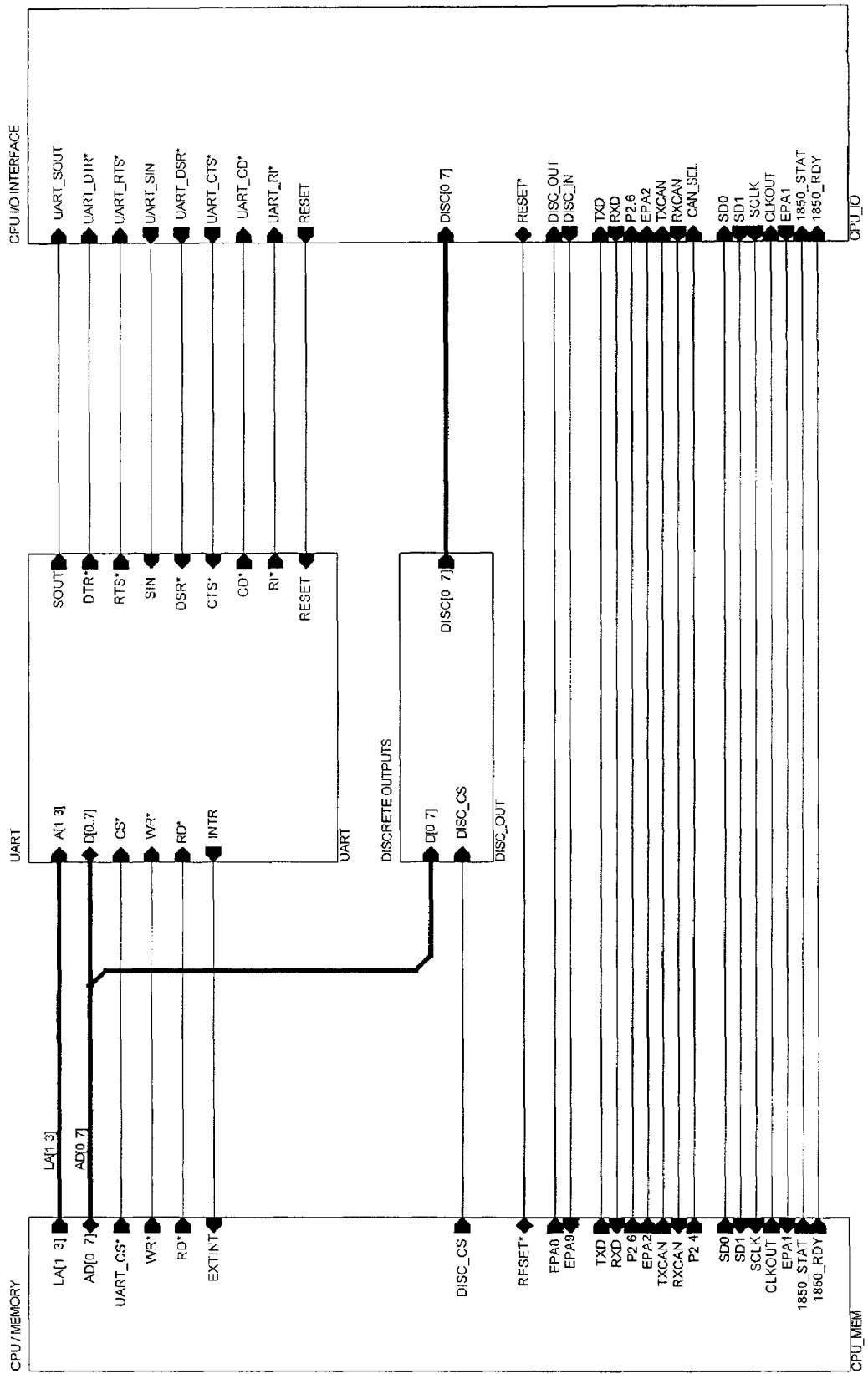
FIG. 1 illustrates DPA III Plus CPU board.
Figure 2:
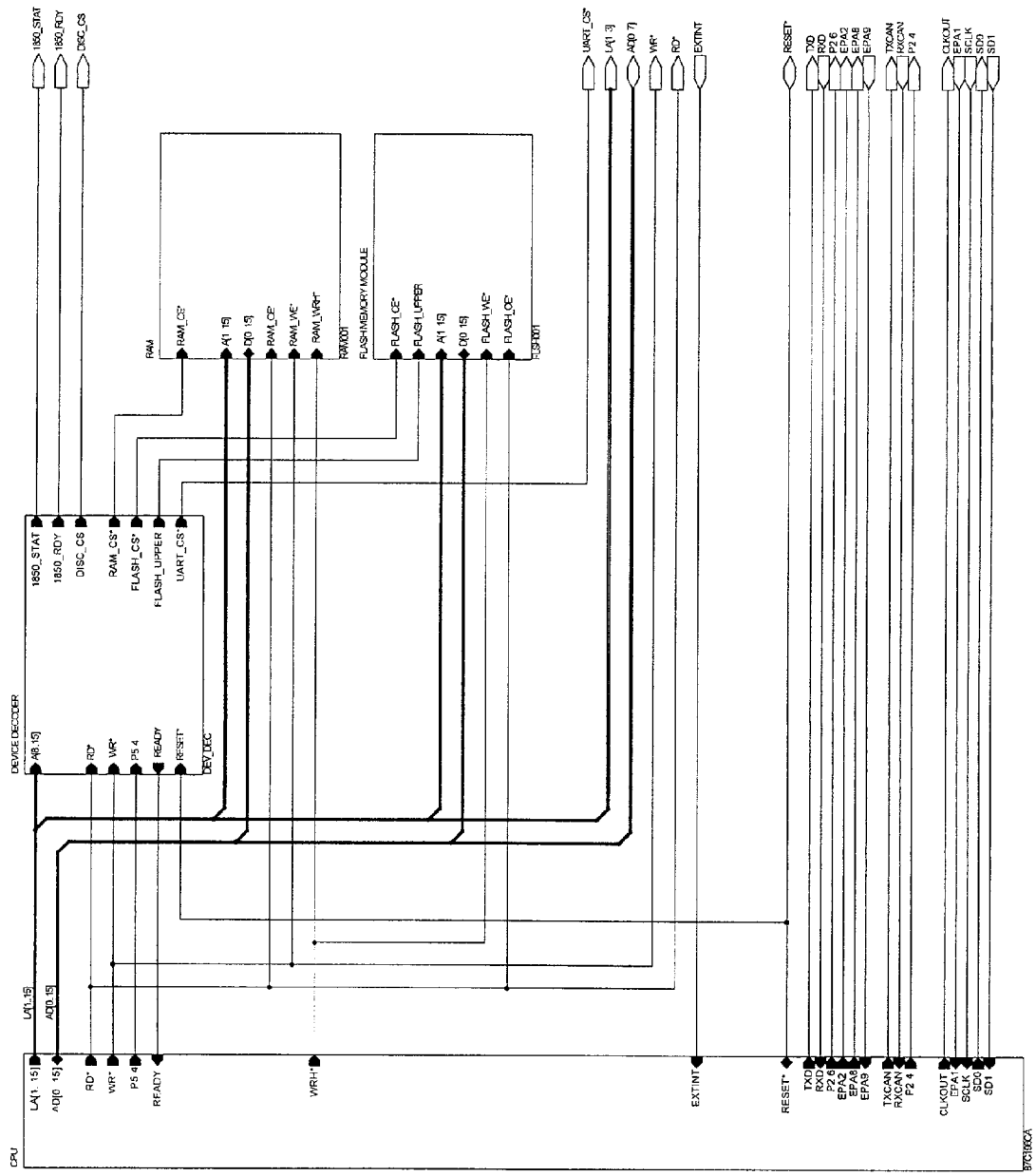
FIG. 2 illustrates CPU Memory Module.
Figure 3:
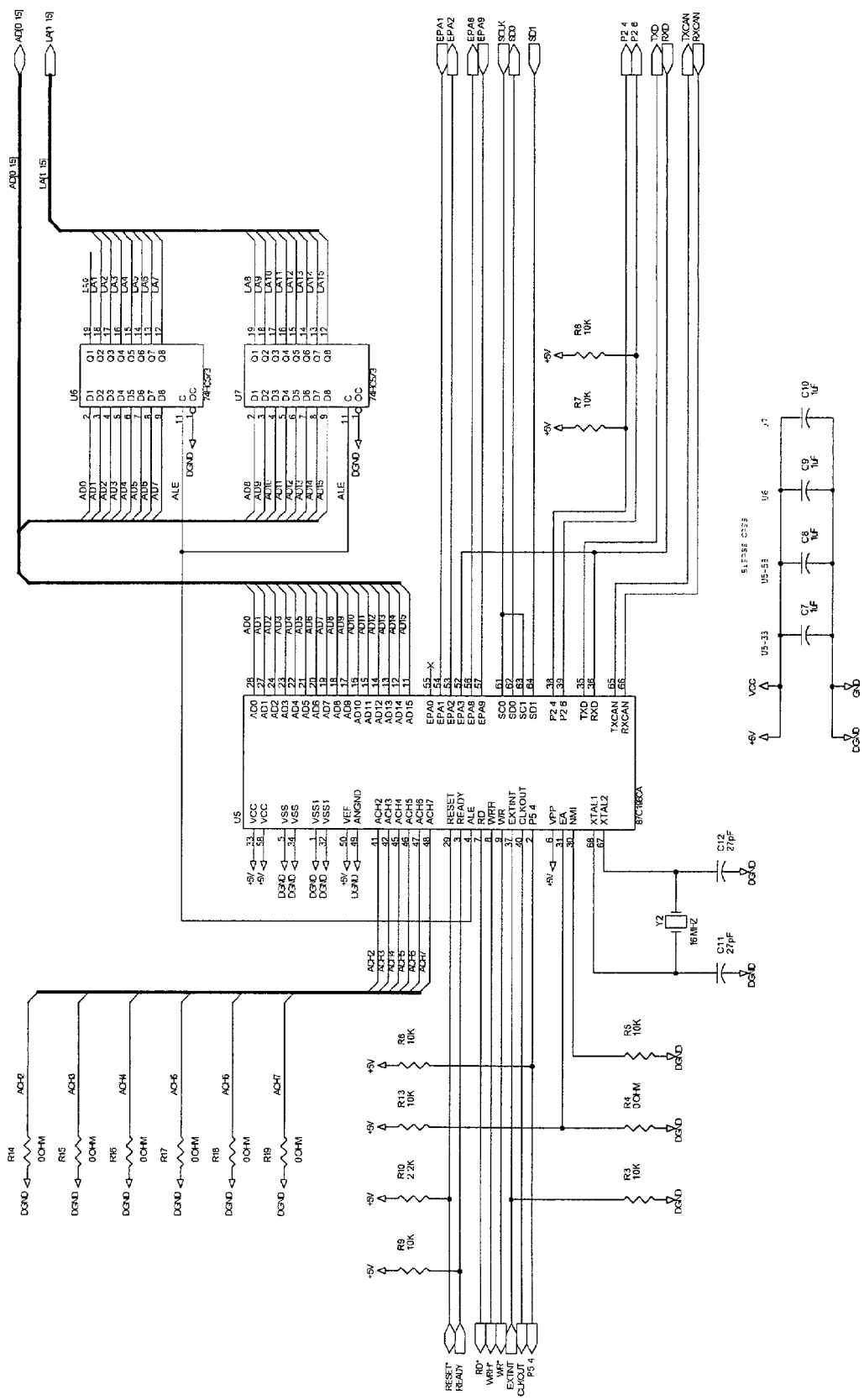
FIG. 3 illustrates Central Processing Unit.
Figure 4:
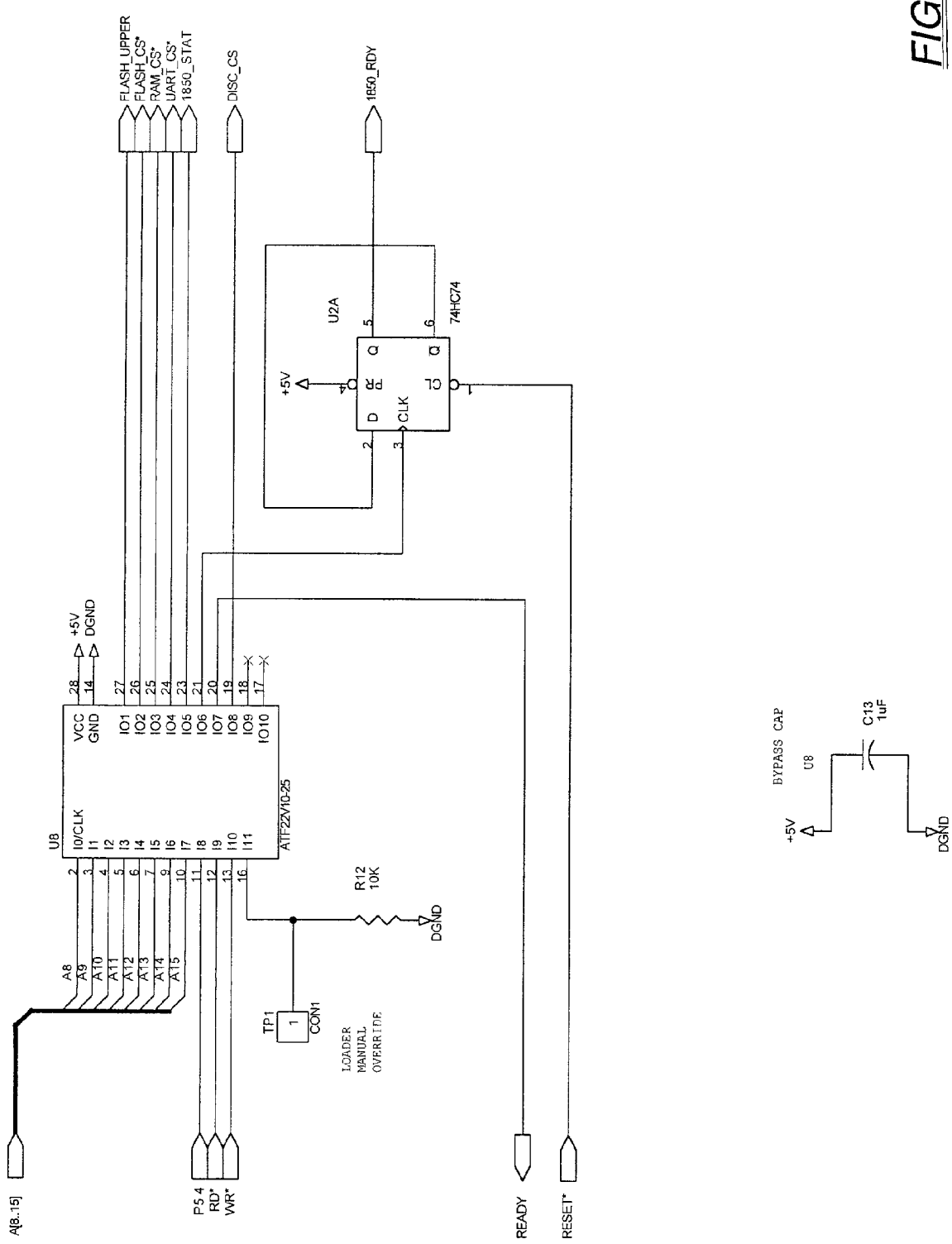
FIG. 4 illustrates Device Decoder.
Figure 5:
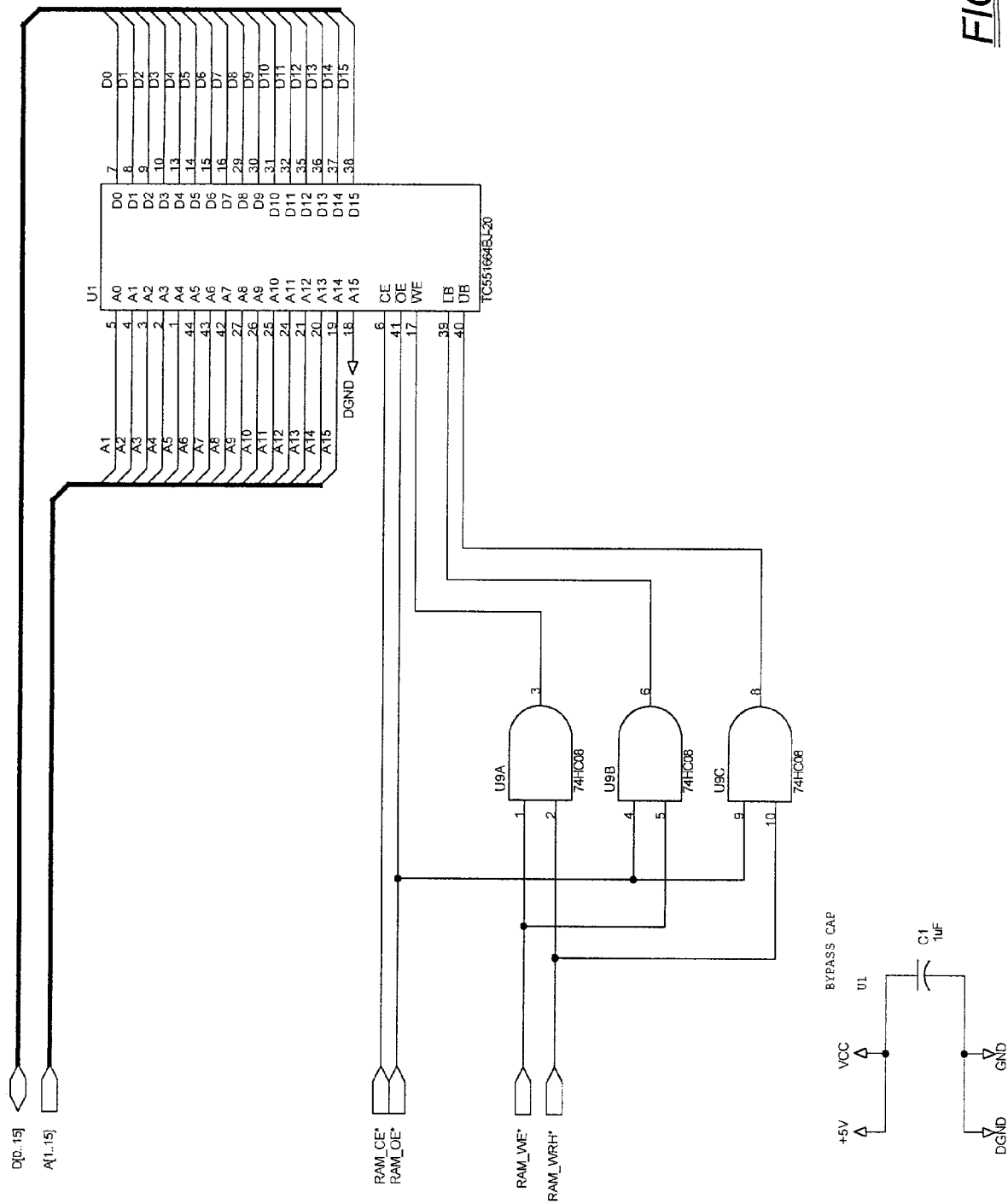
FIG. 5 illustrates static RAM Module.
Figure 7:
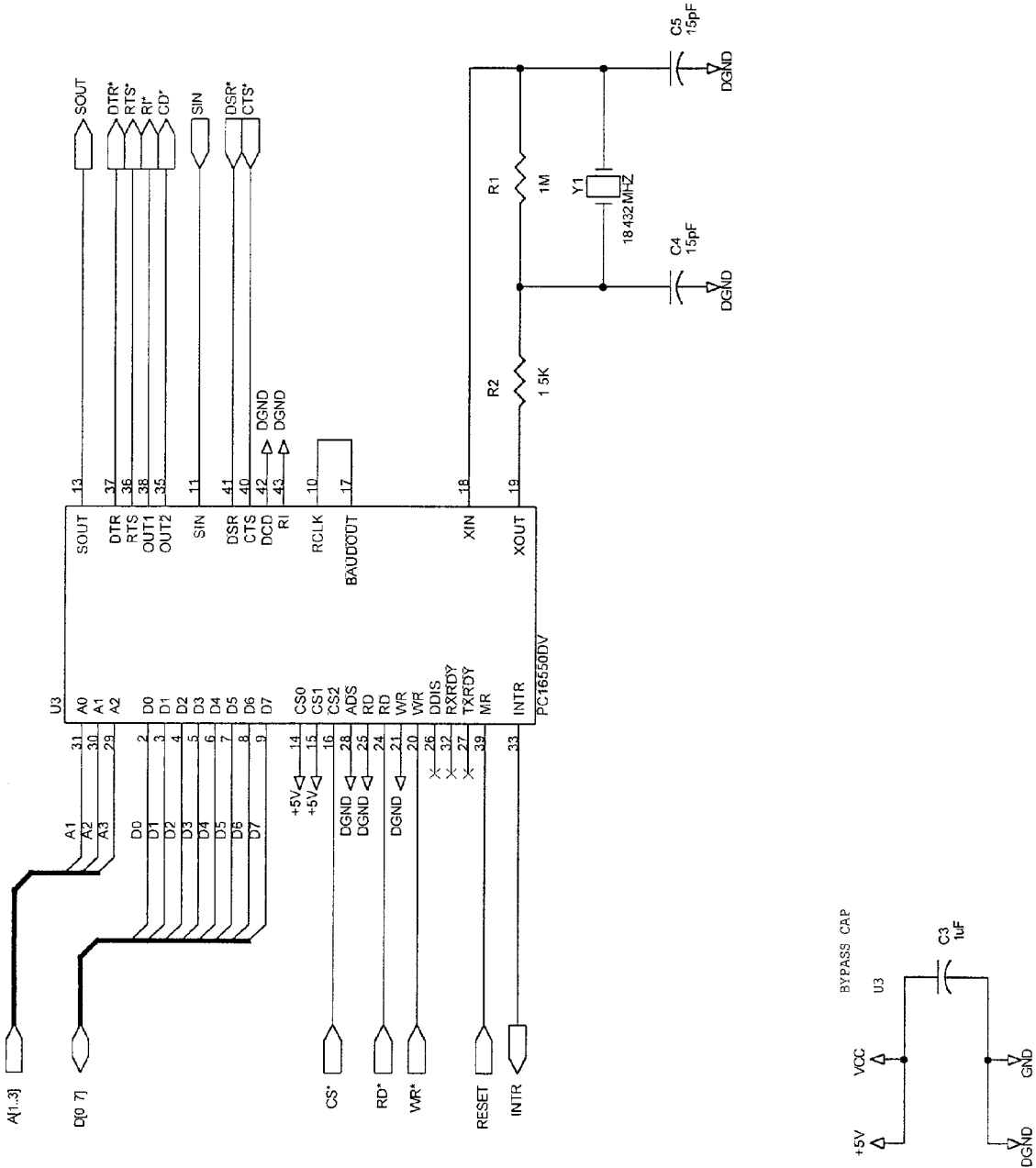
FIG. 7 illustrates UART.
Figure 8:
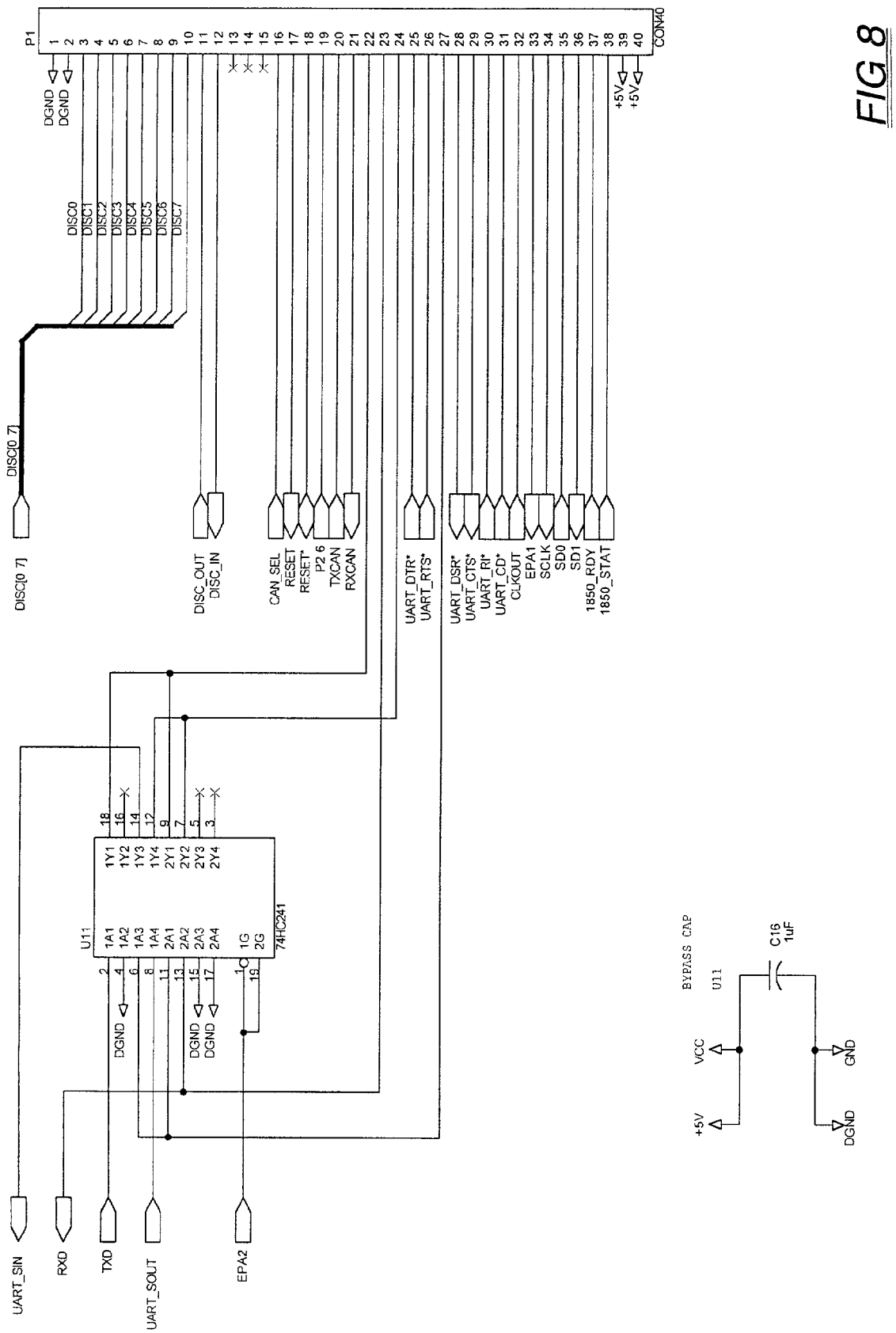
FIG. 8 illustrates CPU/I/O Interface Connectors.
Figure 9:
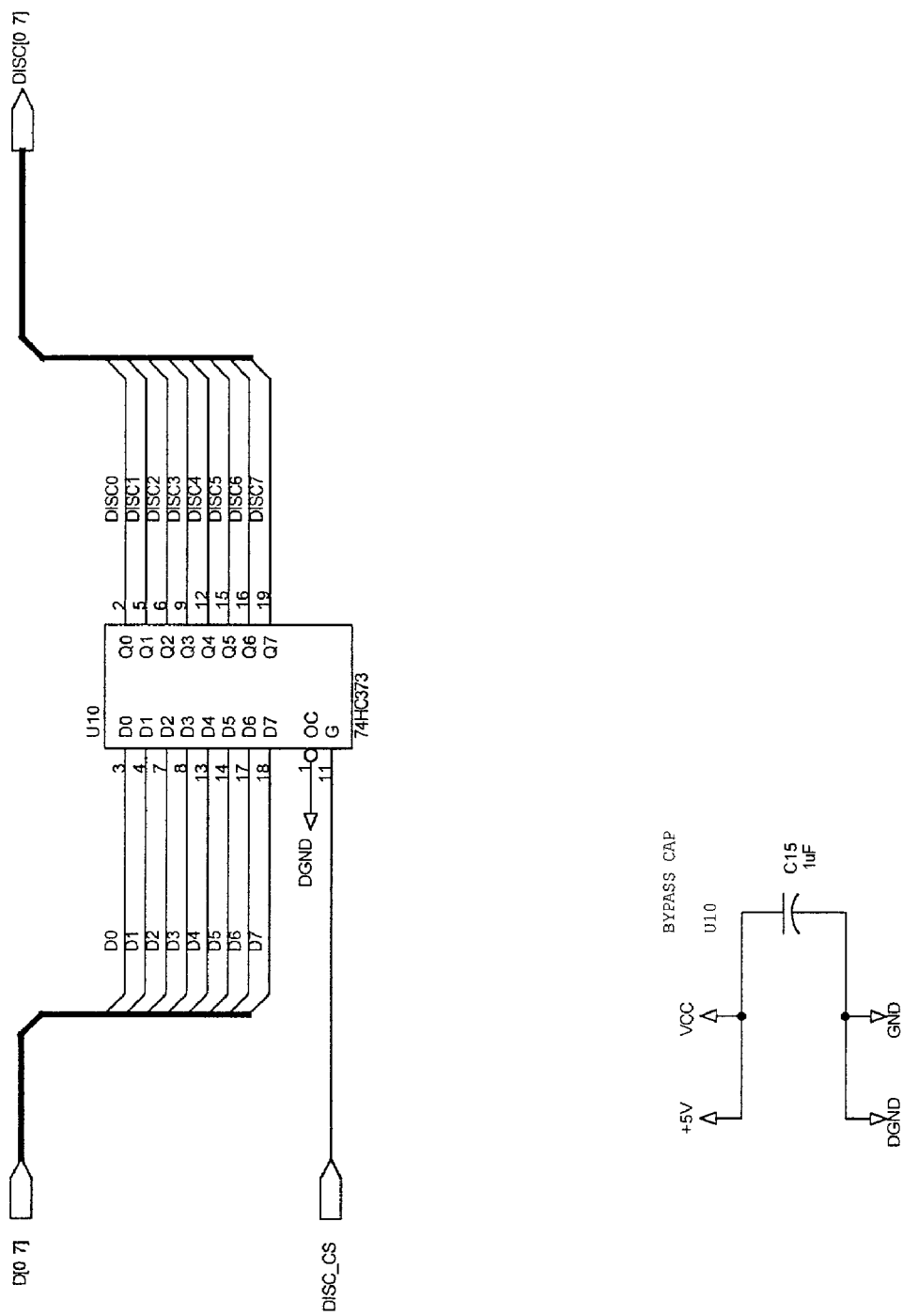
FIG. 9 illustrates Discrete Output Latch.
Figure 10:
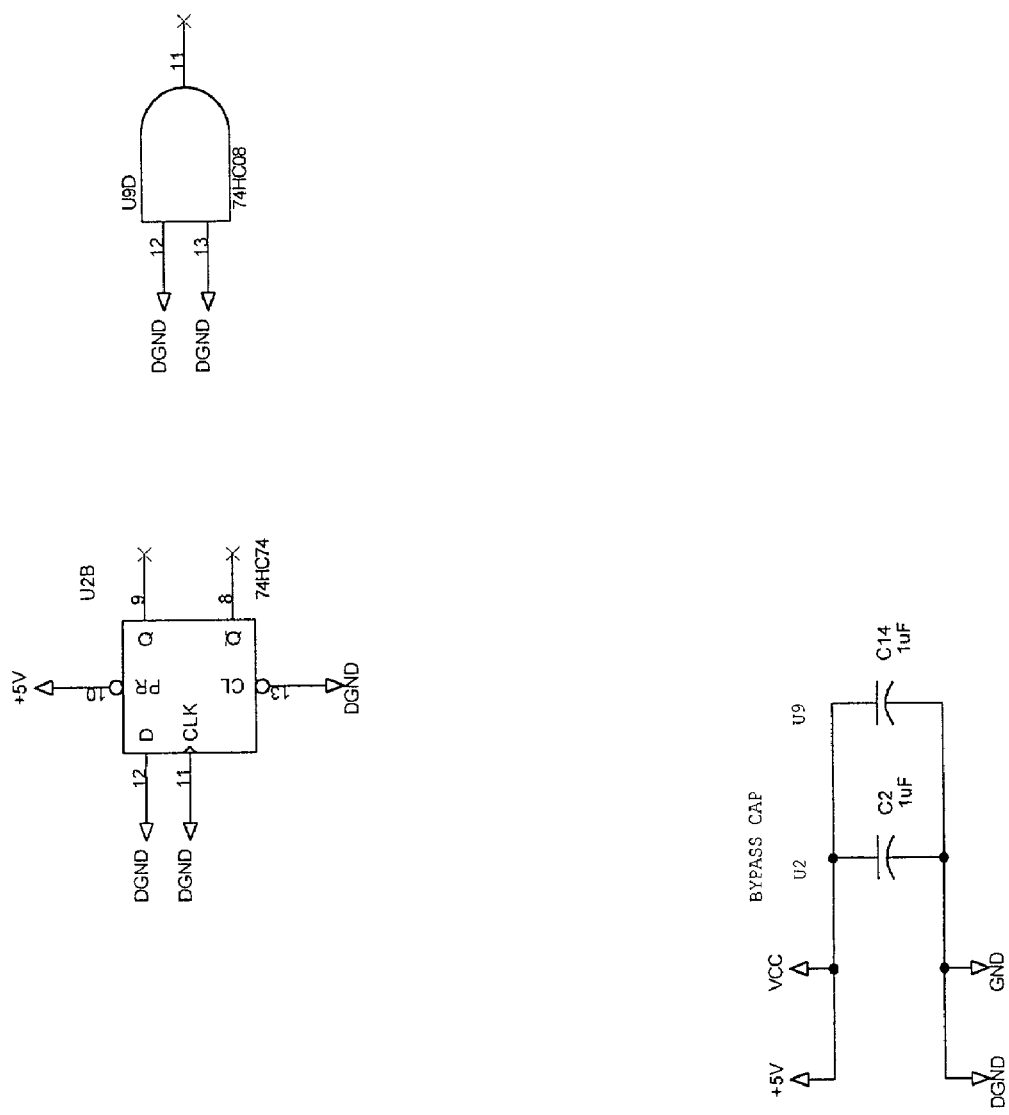
FIG. 10 illustrate Unused Spare Gates.
Figure 11:
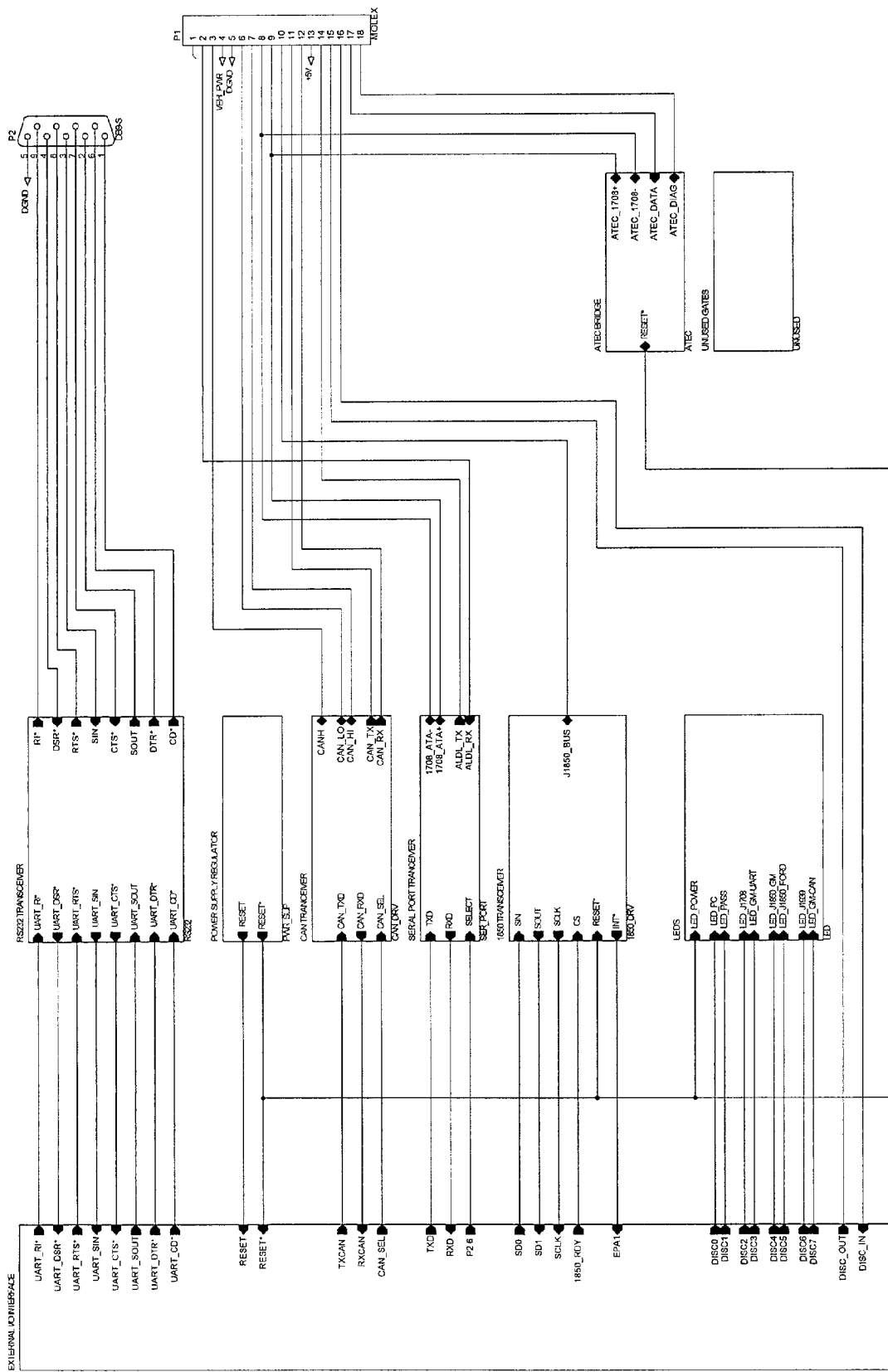
FIG. 11 illustrate DPA I/O Board.
Figure 12:
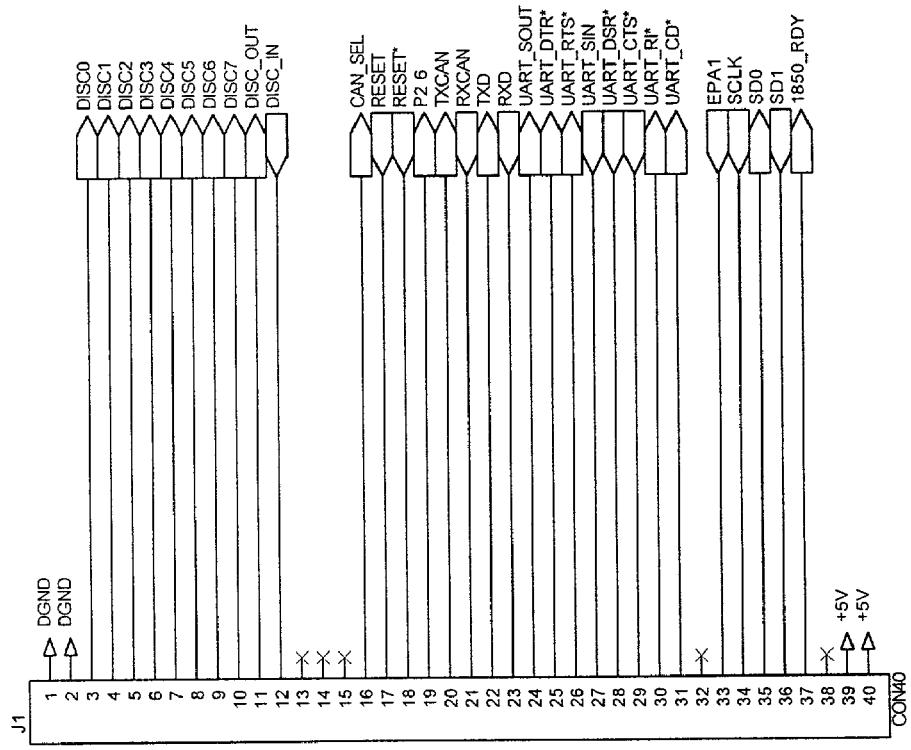
FIG. 12 illustrates I/O Interface Connector.
Figure 14:
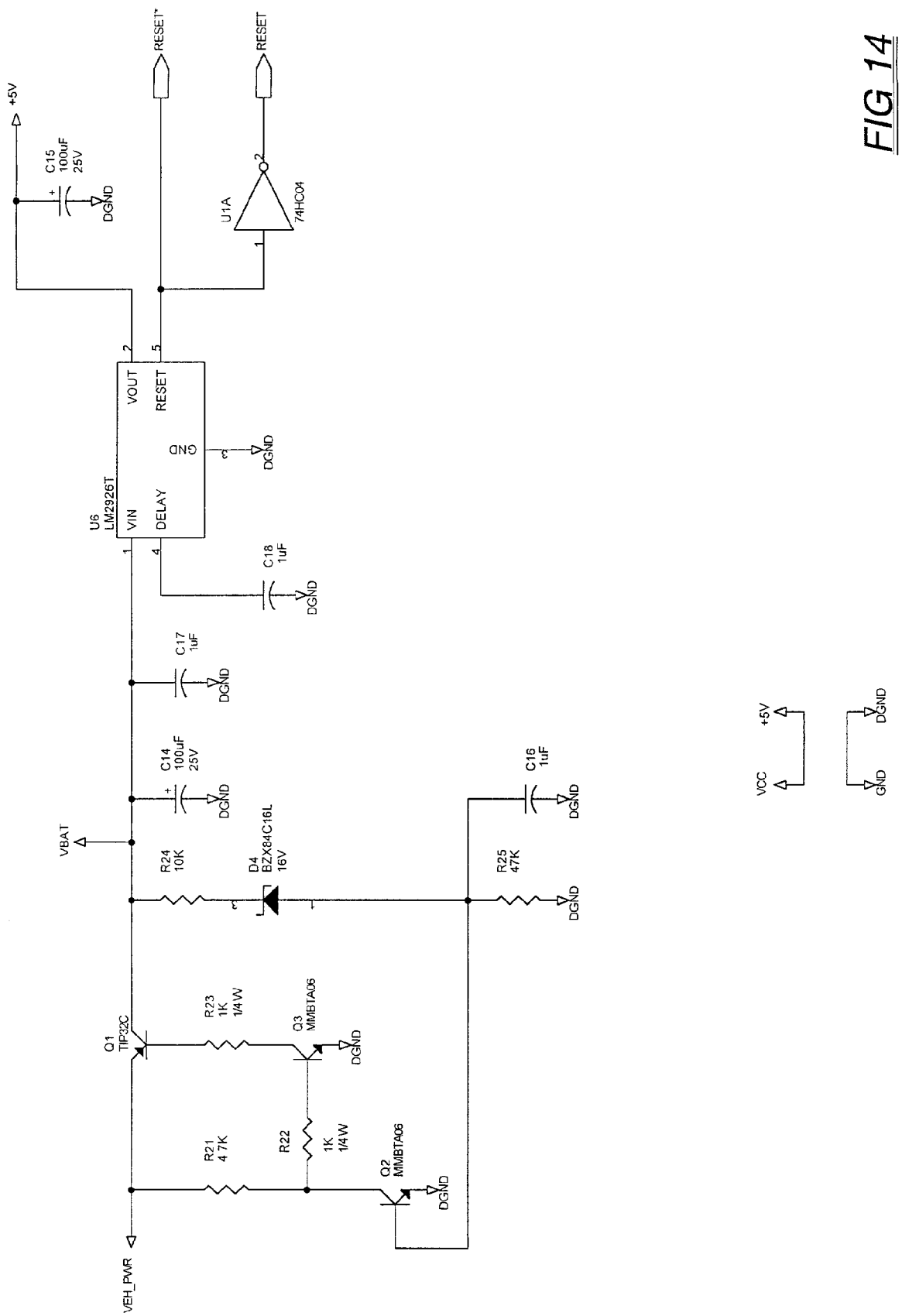
FIG. 14 illustrates Power Supply Regulator.
Figure 15:
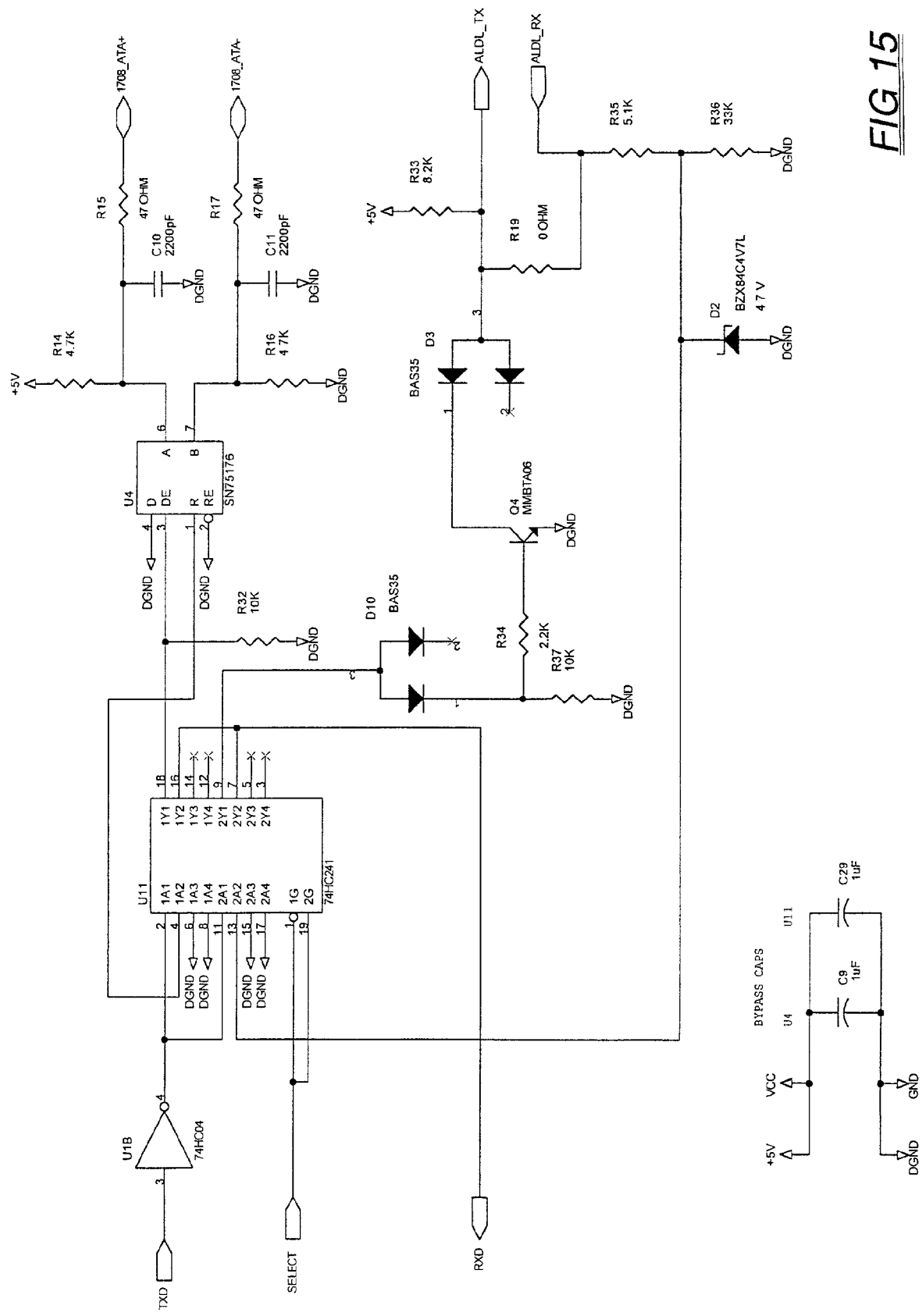
FIG. 15 illustrates 1708 Transceiver.
Figure 16:
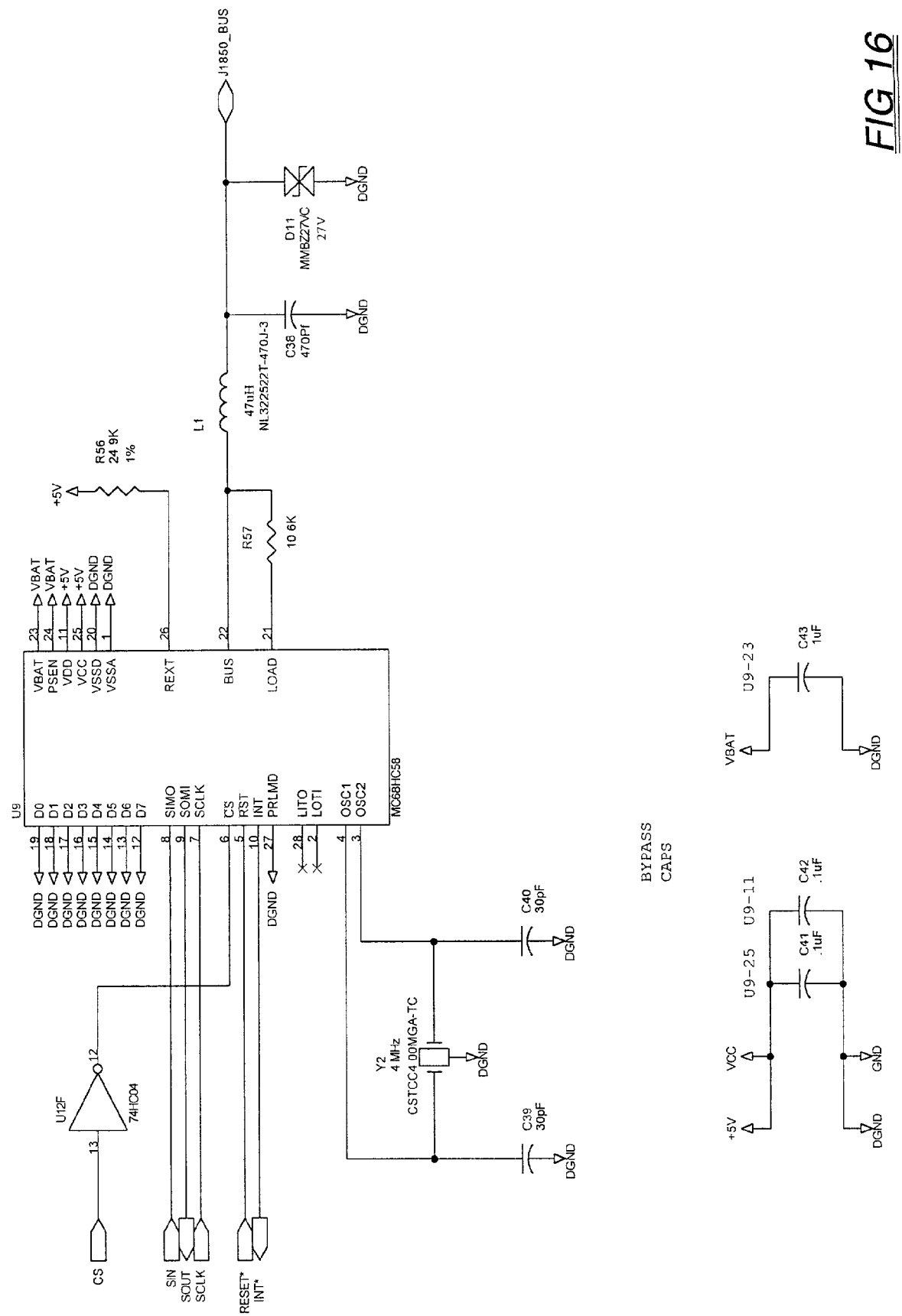
FIG. 16 illustrates J1850 Transceiver.
Figure 17:
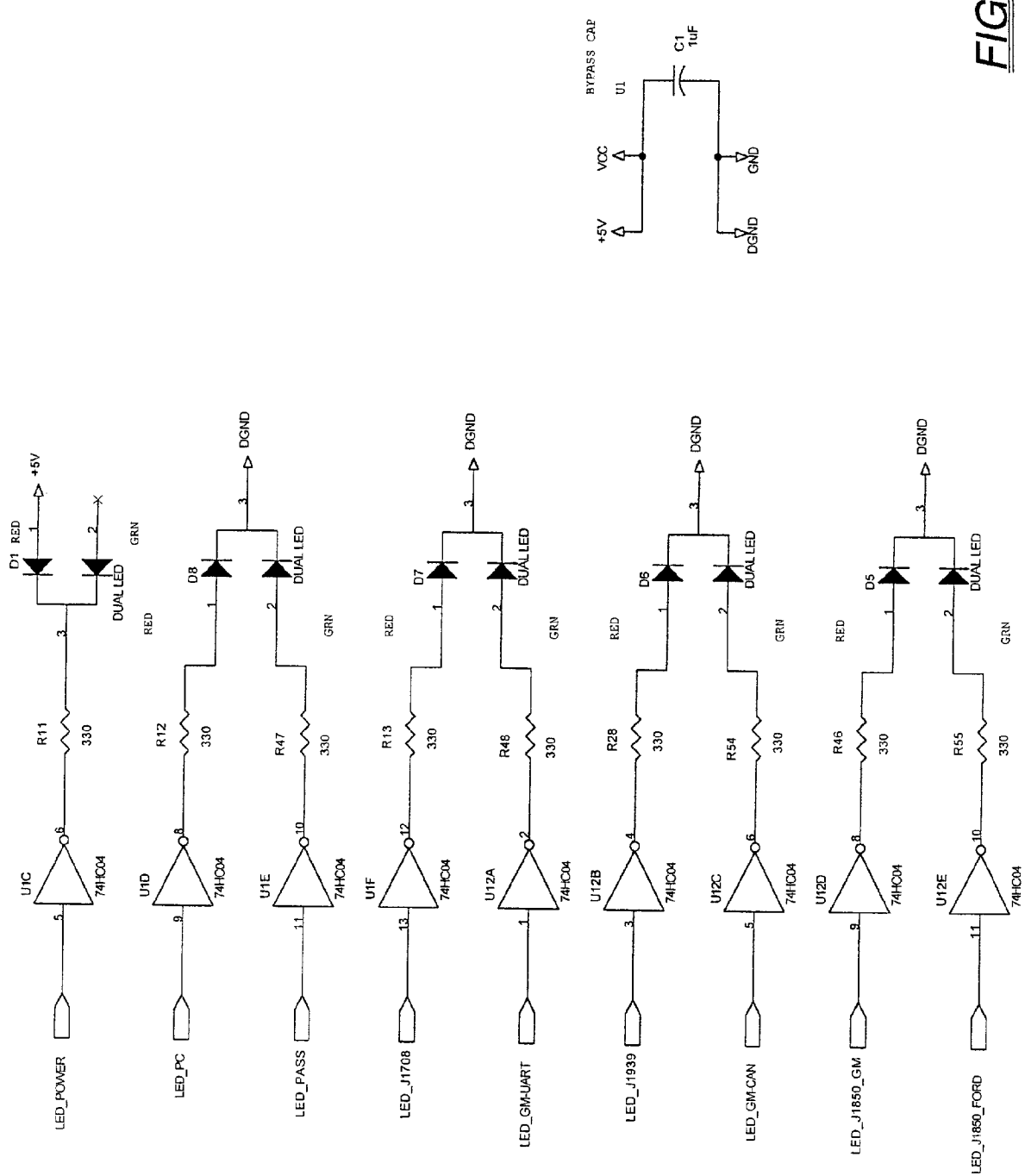
FIG. 17 illustrates LED Indicators.
Figure 18:
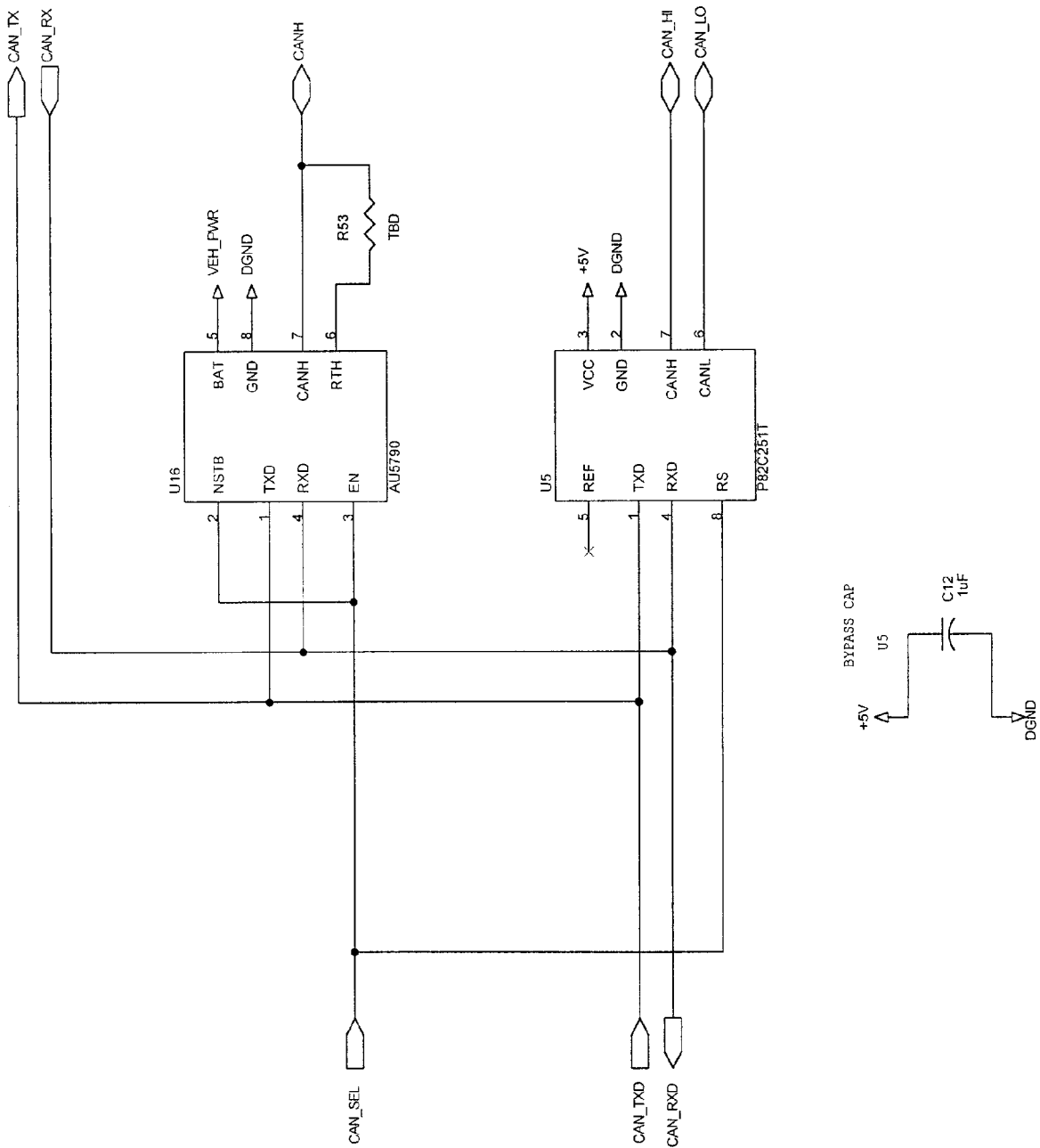
FIG. 18 illustrates CAN Transceiver.
Figure 19:
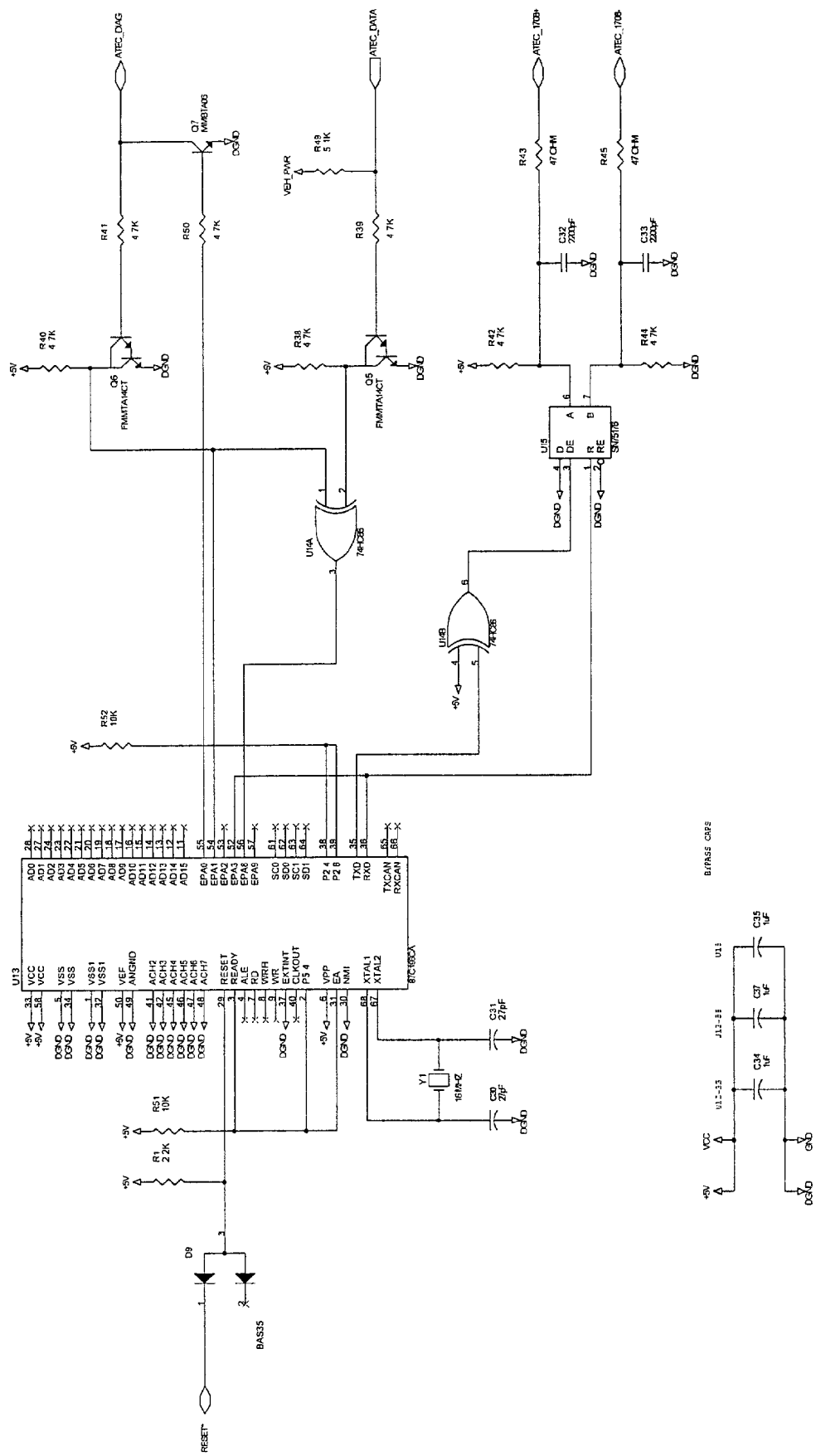
FIG. 19 illustrates ATEC to J1708 Bridge.

Now turning to the drawings, the circuits of the protocol adapter are thereshown in FIGS. 1 through 20.

The pass through/smart mode is U11 (shown on FIG. 8) and is controlled by U5 (shown on FIG. 3) to determine if the host PC is listening to the J1708 link, or if the host PC is wanting to have a slave session with the DPA (diagnostic tool).

The U5 micro (FIG. 3) at power up will flash LEDs 2, 3, 4, and 5 (FIG. 26) to allow the operator to know what version of software is running inside the protocol adapter or diagnostic tool (DPA).

Now turning to FIGS. 21 through 25, the LED descriptions are thereshown with the LED diagram shown in FIG. 26.

The invention claimed is:

1. A protocol adapter for transferring diagnostic signals between in-vehicle networks and a computer, said adapter comprising:
   circuitry for transferring the signals between the in-vehicle networks and the computer for a plurality of different protocols, said circuitry including an RS232 bus for transferring the signals for the plurality of protocols; and
   a device for indicating that signals are being transferred between the adapter and the computer on the RS232 bus, said device also indicating which of the plurality of protocols is being used.

2. The protocol adapter according to claim 1 wherein the device includes:
   at least one LED to visually indicate activity on the RS232 bus between the adapter and the computer.

3. The protocol adapter according to claim 2 wherein the at least one LED is a plurality of LEDs for indicating which of the plurality of protocols is being used at any given time.

4. The protocol adapter according to claim 3 wherein the plurality of LEDs is 8 LEDs.

5. The protocol adapter according to claim 3 wherein the plurality of LEDs include at least one dual-color LED.

* * * * *